Dec. 23, 1958   E. D. V. HASSELBLAD   2,865,078
DEVICE FOR USE IN THE MANUFACTURE OF SPIGOT
AND SOCKET PIPES OF CONCRETE HAVING
PRE-TENSIONED REINFORCEMENTS
Filed June 27, 1955   3 Sheets-Sheet 1

INVENTOR
ERIK D. V. HASSELBLAD

BY Wenderoth, Lind + Ponack
Attys.

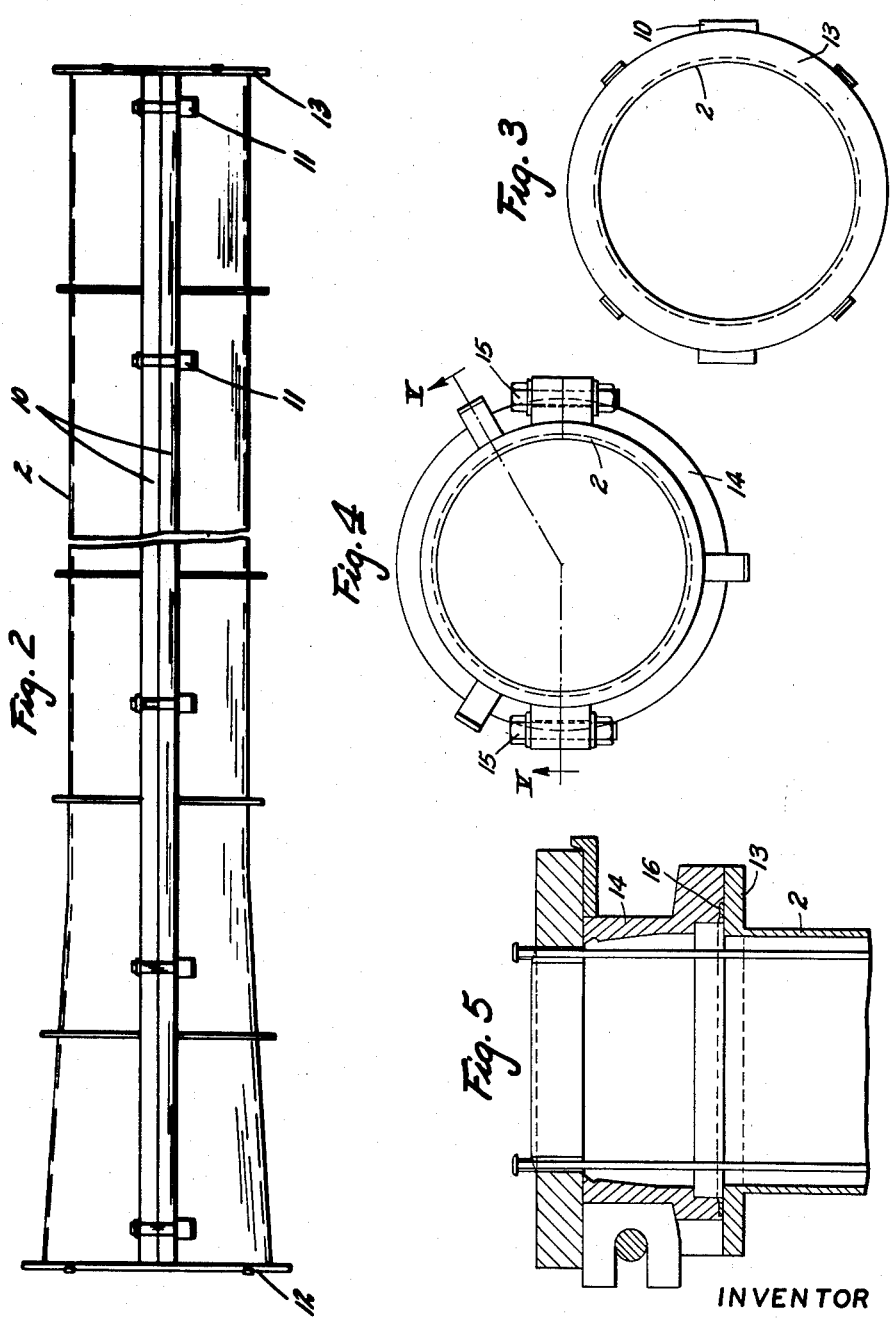

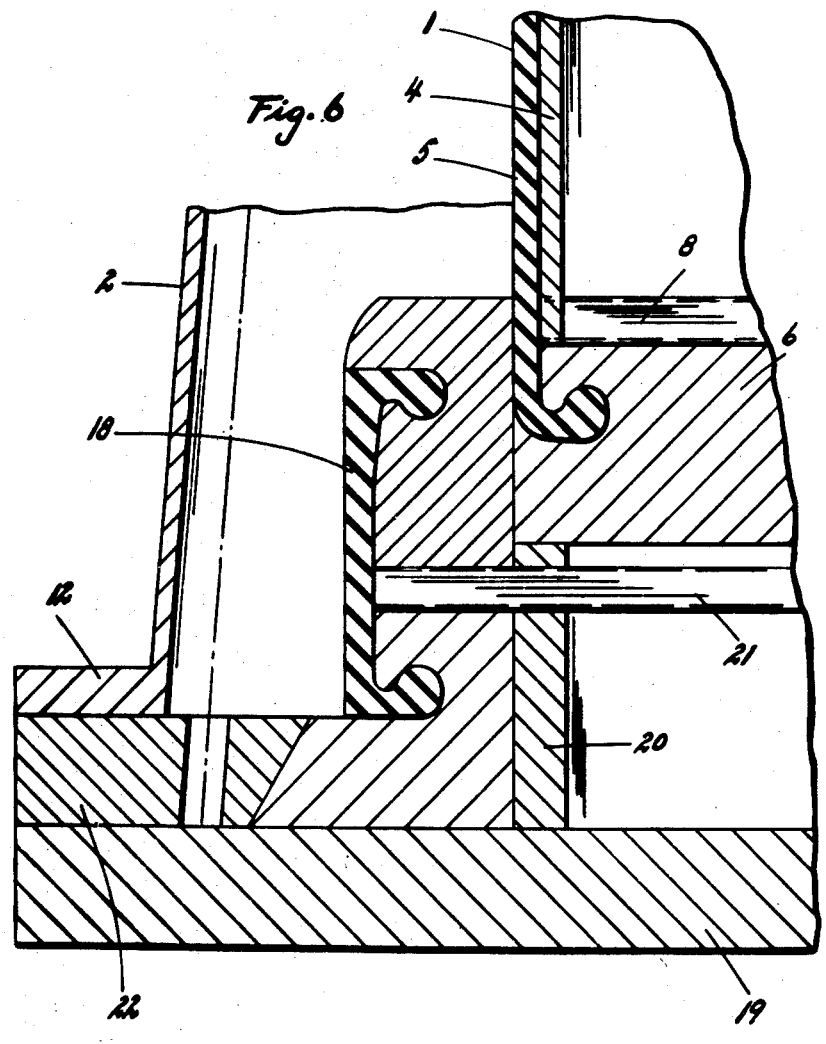

United States Patent Office 2,865,078
Patented Dec. 23, 1958

2,865,078

DEVICE FOR USE IN THE MANUFACTURE OF SPIGOT AND SOCKET PIPES OF CONCRETE HAVING PRE-TENSIONED REINFORCEMENTS

Erik David Valter Hasselblad, Malmo, Sweden, assignor to Aktiebolaget Tryckrör, Limhamn, Sweden, a corporation of Sweden Application June 27, 1955, Serial No. 518,215

2 Claims. (Cl. 25—127)

The present invention relates to a device for use in the manufacture of spigot and socket pipes of concrete in a mould, said concrete preferably having pre-tensioned reinforcements, said mould consisting of an expansible outer mould and an essentially rigid inner mould provided with a coating which can be expanded by fluid pressure and serves to compress the concrete, said device having the purpose of providing surfaces at the ends of the pipes, which surfaces are adapted for connecting the pipes with each other.

When connecting concrete spigot and socket pipes together by inserting one end (the spigot end) of a pipe into the other end (the socket end) of another pipe, said socket end being shaped as a connecting socket, it is important to take care that the connecting joints are satisfactorily sealed. Until now such pipes have mostly been used in pipe lines having no internal pressure and it has been possible to provide the sealing by jointing the pipes with cement mortar or the like between the pipe ends. As a result of the construction of concrete pipes having pre-tensioned reinforcements and manufactured in an expanding mould it has, however, become possible to make pipe lines of concrete pipes for rather high pressures, e. g. of the magnitude 25 to 30 atmospheres or more, in which connection such a simple sealing of the joints is no longer sufficient. The provision of sealing gaskets, e. g. of rubber, in the joints between the pipes has not either given any positive results, since the ends of the pipes have often presented uneven surfaces and too large deviations as to diameter when being formed in expanding moulds; this has made it impossible to ensure that the pipe joints will also be sealed. For this reason the concrete pipes have instead been manufactured with pretensioned reinforcements and have been made straight at both ends and connected by means of loose connecting thimbles displaceable along the pipe so as to cover the abutting ends thereof. However, this has called for considerably more work at the deposition and connection of the pipes than is necessary at the deposition and connection of spigot and socket pipes.

The purpose of the present invention is to provide auxiliary means in moulds having an expanding outer mould for the manufacture of spigot and socket pipes of concrete, preferably but not necessarily having pre-tensioned reinforcements and being of such a design that at the connection of the pipes perfect sealing at the connecting points is easily and safely obtained also in such cases where the pipe lines are to be used for conveying liquids under considerable pressure. This purpose has been achieved by means of a device of the indicated kind, wherein the expansible outer mould at the end where the spigot end of the pipes is to be formed terminates inside the adjacent end of the inner mould, and wherein a stationary ring is removably mounted on the said end of the outer mould enclosing the said end portion of the inner mould and forming with its internal surface a non-resilient forming surface for the concrete, and wherein at the opposite end of the inner mould there is disposed a bead mould provided with a coating which can be expanded by fluid pressure and is of a larger diameter than the coating of the inner mould and separated therefrom.

Through the use of the above-mentioned stationary ring having a non-resilient forming surface the spigot end of the manufactured pipes obtains a smooth and tightly compressed external surface of an exact circular shape and exact diameter within very small tolerances. By means of the bead mould the internal surface of the spigot and socket of the pipe also obtains an improved smoothness and exactitude as to measurements. Consequently, both of these constructional features of the present device contribute to ensuring the requisite sealing properties at the connection of the finished tubes by means of rubber gaskets as sealing means between the said external and internal surfaces facing each other.

For the better understanding of the invention a preferred form as applied to a device for use in the manufacture of spigot and socket pipes of concrete having pre-tensioned reinforcements will now be described with reference to the accompanying drawings.

On the drawings

Fig. 2 is a lateral projection of an outer mould,

Fig. 3 is an end projection of the outer mould as seen from the right in Fig. 2, Fig. 4 is an end projection on a larger scale of a non-resilient ring disposed on the upper end of the outer mould, Fig. 5 is an axial section on line V—V in Fig. 4, and Fig. 6 is an axial section of a bead mould together with parts of an inner mould and an outer mould at the lower end of these.

Figure 1:
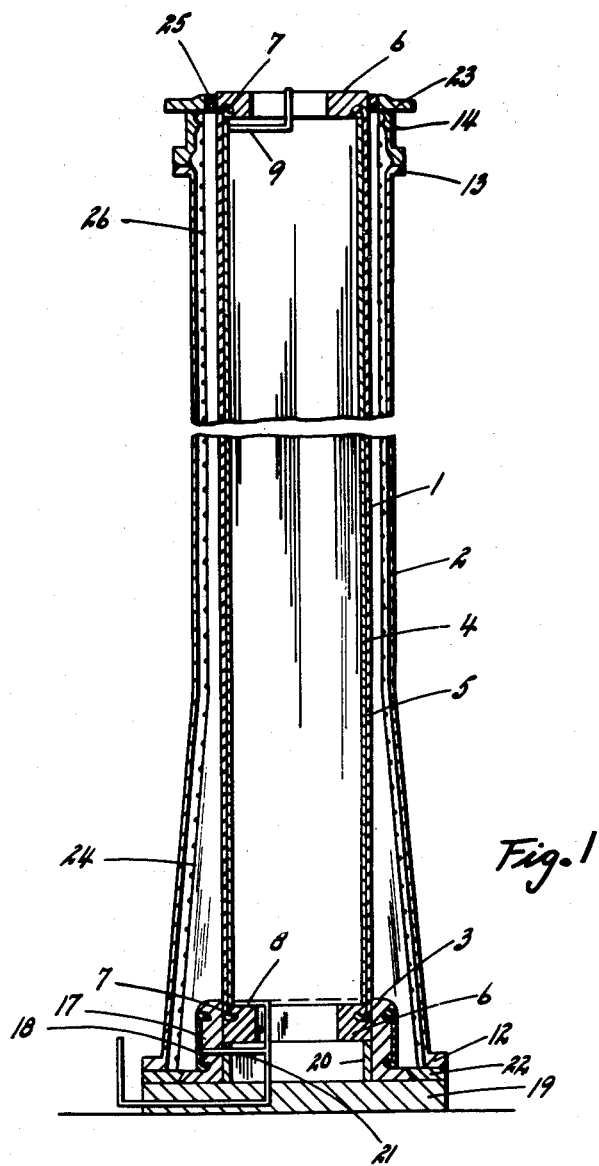
Fig. 1 is a longitudinal section of an assembly of the mould.

The device according to the invention consists of a cylindrical inner mould 1 and a cylindrical outer mould 2 surrounding the former, said two moulds being vertically disposable, and a bead mould 3 disposed between their lower ends.

The inner mould 1 is composed of an essentially rigid core consisting of a pipe 4 continuous along the whole length of the moulds (corresponding to an entire concrete pipe length) and an expansible coating in the form of a rubber sleeve 5 surrounding said pipe. The pipe 4 is provided at both ends with annular end disks 6 welded onto the pipe, and the rubber sleeve 5 is mounted with its ends on said end disks due to its end margins, which are provided with beads 7, being introduced into peripheral grooves in the periphery of the end disks. The pipe 4 is provided with two threaded holes adjacent the ends for connecting pipe lines 8 and 9, which permit supply of a pressure fluid, preferably water under pressure, between the pipe and the rubber sleeve for expanding the latter.

The outer mould 2 is formed from two halves of sheet metal which are connected with each other other by means of longitudinal flanges 10 and resilient bolt connections 11 spaced a suitable distance from each other in the flanges. The outer mould 2 is provided with end rings 12 and 13 welded onto the mould, and on the end ring 13 at the cylindrical and narrower end of the mould there is besides removably mounted a stationary ring 14 (Figs. 4 and 5) which is composed of two halves interconnected by means of bolts 15. The expansible outer mould 2 formed from the two halves terminates below the upper end of the inner mould 1, and the ring 14 forms a radially non-resilient continuation of the outer mould for enclosing the upper end portion of the inner mould. The ring 14 rests against the end ring 13 of the outer mould 2 and between these rings there is interposed a rubber gasket 16, the ring 14 not preventing the radial expansion of the outer mould 2.

The bead mould 3 consists of a rigid core 17 and an expansible coating disposed on the outside of said core and being in the form of a rubber sleeve 18 of an embodiment similar to that of the rubber sleeve 5 of the inner mould 1. The rubber sleeve 18 is fixed to the core 17 in the same way as has been described with regard to the inner mould. The bead mould (Fig. 6) has a conical peripheral surface serving as a centering seat for supporting the outer mould 2. The entire bead mould rests on a support plate 19. On that plate there is also disposed a cylinder ring 20 forming a support for the inner mould 1 which is lowered into the bead mould with its lower end. The core 17 has an opening for connecting a pipe line 21 for pressure fluid, so that the rubber sleeve 18 can be expanded by means of pressure fluid in the same manner as the rubber sleeve 5 of the inner mould and concurrently therewith.

As auxiliary means for retaining a cage of longitudinal reinforcing irons and annular reinforcing irons between the assembled inner and outer moulds there are provided two retaining rings 22 and 23 between which the longitudinal reinforcing irons 24 are mounted with a certain pre-tension. These rings rest against the outer sides of the lower end ring 12 of the outer mould 2 and the stationary ring 14, respectively. The retaining ring 22 has an inner peripheral surface which is conically shaped and fits the conical peripheral surface on the bead mould 3, thus serving not only to fix the longitudinal reinforcing irons 24 but also to center the outer mould at its lower end with respect to the inner mould and the bead mould. At the upper end of the outer mould 2 the latter is also kept centered in relation to the inner mould 1 by means of the retaining ring 23 through the intermediary of a number of spacing members 25 between said ring and the inner mould.

At the assembling of the whole device for casting a spigot and socket pipe of concrete having pre-tensioned reinforcements the reinforcing cage is first mounted, said cage consisting of the longitudinal reinforcing irons 24 and an annular reinforcement 26 wound around these, together with the retaining rings 22 and 23 in the outer mould by means of special auxilary means which do not fall within the scope of this invention and are not, therefore, described here, the rings 22 and 23 resting against the end ring 12 and against the stationary ring 14, respectively. The longitudinal reinforcing irons are given a suitable pre-tension in this connection. The outer mould 2 and the reinforcing cage are then moved down over the inner mould 1 and the bead mould 3.

During the casting operation concrete mass is introduced from above between the moulds 1 and 2 and is vibrated. When the pipe is cast, water is supplied under pressure between the inner mould 1 and the rubber sleeve 5 and between the bead mould 3 and the rubber sleeve 18, which results in the rubber sleeves 5 and 18 being expanded and compressing the concrete. Since the outer mould 2 is resilient on account of the resilient bolt connections betwen its halves, the pressing force is received by the annular reinforcing irons 26 which will thus obtain pre-tension. At the upper end of the device the concrete is compressed against the non-resilient ring 14 and thus obtains a smooth and sealing peripheral surface of a carefully determined diameter. The concrete is now allowed to set while the water pressure is being maintained.

After the concrete has become hard, the outer mould can be disassembled into its various parts. Since the rubber sleeves 5 and 18 have contracted at the disappearance of the water pressure, the concrete pipe is free and can be extracted.

The device according to the invention can be embodied in several ways different from the one described, without departing from the scope of the invention. An instance of another embodiment of the expansible outer mould, which is suitable for large pipe dimensions, is that it can be made in more than two parts and can be held together by resilient means.

What I claim and desire to secure by Letters Patent is:

1. A device for use in the manufacture of spigot and socket pipes of concrete comprising a resiliently expansible outer mold, a substantially rigid inner mold, an expansible cover surrounding said inner mold, fluid pressure means for expanding said covering, a rigid ring open on both ends mounted on one end of said outer mold in abutting and radially slidable relationship as an extension thereof, said ring surrounding the adjacent end of said inner mold and said covering for forming the spigot ends of the pipe, a reinforcing rod retaining ring against the free end of said rigid ring for retaining reinforcing rods which extend therethrough in position between said outer and inner molds, a socket mold associated with said inner mold at the opposite end from the said rigid ring, an expansible covering surrounding said socket mold and having a larger diameter than the expansible covering surrounding said inner mold for forming the socket ends of the pipes to match the spigot end thereof, reinforcing rod retaining means around said socket mold for retaining the ends of reinforcing rods in position between said outer mold and said socket mold, and fluid pressure means for expanding said expansible covering surrounding said socket mold.

2. A device for use in the manufacture of spigot and socket pipes of prestressed concrete comprising a resiliently expansible outer mold, a substantially rigid inner mold, an expansible cover surrounding said inner mold, fluid pressure means for expanding said covering, a rigid ring open on both ends mounted on one end of said outer mold in abutting and radially slidable relationship as an extension thereof, said ring surrounding the adjacent end of said inner mold and said covering for forming the spigot ends of the pipe, a reinforcing rod retaining ring against the free end of said rigid ring for retaining reinforcing rods which extend therethrough in position between said outer and inner molds, a socket mold means associated with said inner mold at the opposite end from the said rigid ring for forming the socket end of the pipes to match the spigot end thereof, and reinforcing rod retaining means around said socket mold for retaining the ends of reinforcing rods in position between said outer mold and said socket mold means.

References Cited in the file of this patent

UNITED STATES PATENTS

| 1,103,664 | Draper | July 14, 1914 |
| 1,423,284 | Weaver | July 18, 1922 |
| 2,612,673 | Billner | Oct. 7, 1952 |

FOREIGN PATENTS

| 468,690 | Canada | Sept. 25, 1946 |
| 544,819 | Great Britain | Apr. 29, 1942 |